US012186716B1

(12) United States Patent
Broome

(10) Patent No.: US 12,186,716 B1
(45) Date of Patent: Jan. 7, 2025

(54) DISSOLUTION GENERATOR AND BOTTLING SYSTEM AND METHOD

(71) Applicant: Hubert R. Broome, Belmont, NC (US)

(72) Inventor: Hubert R. Broome, Belmont, NC (US)

( * ) Notice: Subject to any disclaimer, the term of this patent is extended or adjusted under 35 U.S.C. 154(b) by 868 days.

(21) Appl. No.: 17/338,821

(22) Filed: Jun. 4, 2021

Related U.S. Application Data

(63) Continuation-in-part of application No. 16/030,369, filed on Jul. 9, 2018, now Pat. No. 11,058,999.

(60) Provisional application No. 62/530,410, filed on Jul. 10, 2017.

(51) Int. Cl.

| | |
|---|---|
| ***B01F 21/00*** | (2022.01) |
| ***B01F 21/10*** | (2022.01) |
| ***B01F 21/20*** | (2022.01) |
| ***B01F 25/51*** | (2022.01) |
| ***B67C 3/02*** | (2006.01) |
| *B01F 101/48* | (2022.01) |

(52) U.S. Cl.
CPC .............. *B01F 21/30* (2022.01); *B01F 21/02* (2022.01); *B01F 21/10* (2022.01); *B01F 21/221* (2022.01); *B01F 25/51* (2022.01); *B67C 3/02* (2013.01); *B01F 21/503* (2022.01); *B01F 2101/48* (2022.01)

(58) Field of Classification Search
None
See application file for complete search history.

(56) References Cited

U.S. PATENT DOCUMENTS

| | | |
|---|---|---|
| 2,083,076 A | 6/1937 | Mau |
| 2,906,607 A | 9/1959 | Jamison |
| 3,036,739 A | 5/1962 | Kamysz, Jr. |
| 3,574,561 A | 4/1971 | Nickerson et al. |

(Continued)

FOREIGN PATENT DOCUMENTS

| | | |
|---|---|---|
| EP | 0058507 | 11/1984 |
| EP | 0231603 | 6/1990 |

(Continued)

OTHER PUBLICATIONS

Packaging Dynamics Brochure, retrieved from Internet Website <https://packagingdynamics.com/products/nozzles/> on Jun. 4, 2021.

*Primary Examiner* — Anshu Bhatia
(74) *Attorney, Agent, or Firm* — Trego, Hines & Ladenheim, PLLC

(57) ABSTRACT

A method of preparing a liquid product includes: providing a box or carton containing a predetermined quantity of at least one powder-based constituent and a predetermined quantity of at least one liquid additive in an additive container; placing the powder-based constituent in a housing of a dissolution generator, adjacent a screen assembly; using a pressure mechanism to apply a pressure to the powder against the screen assembly; spraying at least a solvent at the powder from a spray nozzle through the powder support screen assembly, thereby dissolving exposed powder and producing a solution; discharging the solution into a mixing chamber; using the solvent, purging the at least one liquid additive from the respective additive container into the mixing chamber; mixing the solution and the at least one liquid additive in the mixing chamber so as to form the liquid product; and dispensing the liquid product from the apparatus.

12 Claims, 9 Drawing Sheets

(56) References Cited

U.S. PATENT DOCUMENTS

| | | | |
|---|---|---|---|
| 3,595,438 | A | 7/1971 | Daley et al. |
| 3,607,105 | A | 9/1971 | Reid et al. |
| 3,752,446 | A | 8/1973 | Watanabe |
| 4,020,865 | A | 5/1977 | Moffat et al. |
| 4,023,778 | A | 5/1977 | Joly et al. |
| 4,063,663 | A | 12/1977 | Larson et al. |
| 4,164,541 | A | 8/1979 | Platz et al. |
| 4,293,914 | A | 10/1981 | Van Trang |
| 4,462,511 | A | 7/1984 | Fulmer et al. |
| 4,462,967 | A | 7/1984 | Berelson |
| 4,687,121 | A | 8/1987 | Copeland |
| 4,816,222 | A | 3/1989 | Fagrell |
| 4,826,661 | A | 5/1989 | Copeland et al. |
| 4,836,229 | A | 6/1989 | Lakhan et al. |
| 4,858,449 | A | 8/1989 | Lehn |
| 4,938,240 | A | 7/1990 | Akhan et al. |
| 5,007,559 | A | 4/1991 | Young |
| 5,253,937 | A | 10/1993 | Scheimann et al. |
| 5,374,119 | A | 12/1994 | Scheimann |
| 5,389,344 | A | 2/1995 | Copeland et al. |
| 5,393,502 | A | 2/1995 | Miller et al. |
| 5,411,716 | A | 5/1995 | Thomas et al. |
| 5,427,748 | A | 6/1995 | Wiedrich et al. |
| 5,439,020 | A | 8/1995 | Lockhart |
| 5,472,674 | A | 12/1995 | Rings et al. |
| 5,505,223 | A | 4/1996 | Rings et al. |
| 5,505,915 | A | 4/1996 | Copeland et al. |
| 5,607,651 | A | 3/1997 | Thomas et al. |
| 5,655,563 | A | 8/1997 | Johnson |
| 5,678,593 | A | 10/1997 | Lockhart |
| 5,681,109 | A | 10/1997 | Palmer |
| 5,685,640 | A | 11/1997 | Goedicke et al. |
| 5,713,384 | A | 2/1998 | Roach et al. |
| 5,765,945 | A | 6/1998 | Palmer |
| 5,928,608 | A | 7/1999 | Levesque et al. |
| 5,947,596 | A | 9/1999 | Dowd |
| 6,186,657 | B1 | 2/2001 | Fuchsbichler |
| 6,924,257 | B2 | 8/2005 | Klos et al. |
| 7,045,021 | B2 | 5/2006 | Ewing et al. |
| 7,134,781 | B2 | 11/2006 | Roberts et al. |
| 7,617,832 | B2 | 11/2009 | MacDowell |
| 2003/0085239 | A1 | 5/2003 | Crain et al. |
| 2006/0135394 | A1 | 6/2006 | Smith et al. |
| 2009/0139545 | A1 | 6/2009 | Rowlands et al. |
| 2010/0226835 | A1 | 9/2010 | Carroll et al. |
| 2012/0273585 | A1* | 11/2012 | Broome ................ B01F 21/221 239/10 |
| 2013/0099155 | A1 | 4/2013 | Nesheim et al. |

FOREIGN PATENT DOCUMENTS

| | | |
|---|---|---|
| EP | 0300819 | 5/1993 |
| EP | 0244153 | 1/1994 |
| EP | 0288918 | 11/1995 |
| EP | 0225859 | 10/1996 |
| GB | 2288191 | 10/1995 |
| WO | 9211929 | 7/1992 |
| WO | 9221808 | 12/1992 |
| WO | 9303217 | 2/1993 |
| WO | 9416805 | 8/1994 |
| WO | 9617543 | 6/1996 |
| WO | 9935078 | 7/1999 |
| WO | 2005110574 | 11/2005 |
| WO | 2006037354 | 4/2006 |
| WO | 2008077437 | 7/2008 |

* cited by examiner

DISSOLUTION GENERATOR AND BOTTLING SYSTEM AND METHOD

CROSS-REFERENCE TO RELATED APPLICATIONS

This application is a Continuation-In-Part of U.S. patent application Ser. No. 16/030,369 filed Jul. 9, 2018, currently pending, which claims the benefit of provisional patent application 62/530,410 filed Jul. 10, 2017, both of which are hereby incorporated by reference.

BACKGROUND

This invention relates generally to solid/liquid handling systems and more particularly to a system and method for rapidly dissolving soluble particulate solids and solvents components to prepare ready to use highly concentrated solutions.

Various chemical mixture and solution systems require that liquids and solid particulates be mixed at a specific concentrations. Often, high concentration solutions are desirable from economic and handling perspectives. However, in concentrated systems problems of material separation and settling are encountered prior to a product being utilized when further diluted by an end user.

High concentration liquids are often heavy to transport in larger quantities and thus, it is desirable to have smaller containers for transport to a commercial end user. But, many mixing systems are designed for large quantities of materials. For example in product form, 55-gallon drums of products are conventional and common, despite requiring heavy and large steel drums for shipping. One example of such a system is described in U.S. Pat. No. 8,210,215 to Lewis, et al. which is designed to mix powders and solvents (water) in relatively large quantities but relies on slow impeller mixers that only mixes small volumes in a relatively large quantity, thus taking relatively long preparation times. Such systems are awkward in terms of component mixing and present potential safety hazards.

In contrast, other component mixing systems are designed for commercial, single use product preparation at the location where an end user may find and purchase the same. U.S. Pat. No. 7,131,468 issued to Schuman et al. is an example of a small, dispenser system for preparing solutions of a liquid solvent (e.g. water) and a solute such as soap, et al. For a retail user such quantities are useful, but such a machine would be awkwardly scaled up for larger quantities of solutions.

Accordingly, there is a need in the mixing/solution art for a flexible, easy to use system and method that is easily scalable; that provides for thoroughly mixing a usable, stable product, produced from multiple components, in a variety of product container sizes and produces the same in relatively short time frames.

BRIEF SUMMARY OF THE INVENTION this need is addressed by a dissolution generator, mixing system, and method for using the apparatus to disperse and mix solids and liquids into a solvent.

According to one aspect of the technology described herein, a method is provided for preparing a liquid product using a dissolution generator apparatus, the method includes: providing a box or carton which contains a predetermined quantity of at least one powder-based constituent and a predetermined quantity of at least one liquid additive in an additive container; placing the powder-based constituent in a housing of a dissolution generator of the apparatus, adjacent a screen assembly; using a pressure mechanism to apply a pressure to the powder against the screen assembly; spraying at least a solvent at the powder from a spray nozzle through the powder support screen assembly, thereby dissolving exposed powder and producing a solution; discharging the solution into a mixing chamber of the apparatus; using the solvent, purging the at least one liquid additive from the respective additive container into the mixing chamber; mixing the solution and the at least one liquid additive in the mixing chamber so as to form the liquid product; and dispensing the liquid product from the apparatus.

According to another aspect of the technology described herein, a dissolution generator and bottling apparatus includes: a dissolution generator, including: a housing shell; a powder support screen assembly extending across an interior of the housing shell and configured to support a column of powder; a pressure mechanism disposed adjacent the powder support screen assembly; a spray delivery assembly located adjacent the powder support screen assembly opposite to the pressure mechanism, the spray delivery assembly comprising a spray nozzle configured to spray a solvent through the powder support screen assembly; a duct having a first end in fluid communication with the housing shell, and a second end; a dissolved powder reservoir in fluid communication with the second end of the duct and with a mixing chamber; at least one additive displacement valve disposed in fluid communication with the mixing chamber and a filler supply pipe; and a holding tank in fluid communication with the mixing chamber and the filler supply pipe.

According to another aspect of the technology described herein, a method is provided for preparing and bottling a liquid product using a dissolution generator apparatus. The method includes: placing a powder-based constituent in a housing of a dissolution generator of the apparatus, adjacent a screen assembly; using a pressure mechanism to apply a pressure to the powder against the screen assembly; spraying at least a solvent at the powder from a spray nozzle through the powder support screen assembly, thereby dissolving exposed powder and producing a solution; discharging the solution into a mixing chamber of the apparatus; using the solvent, purging at least one liquid additive from an additive container into the mixing chamber through an additive displacement valve; mixing the solution and the at least one liquid additive in the mixing chamber so as to form the liquid product; transferring the liquid product to a holding tank; flowing the liquid product from the holding tank through the additive displacement valve into a product container.

BRIEF DESCRIPTION OF THE DRAWINGS

The invention may be best understood by reference to the following description taken in conjunction with the accompanying drawing figures in which.

DETAILED DESCRIPTION

Figure 1:
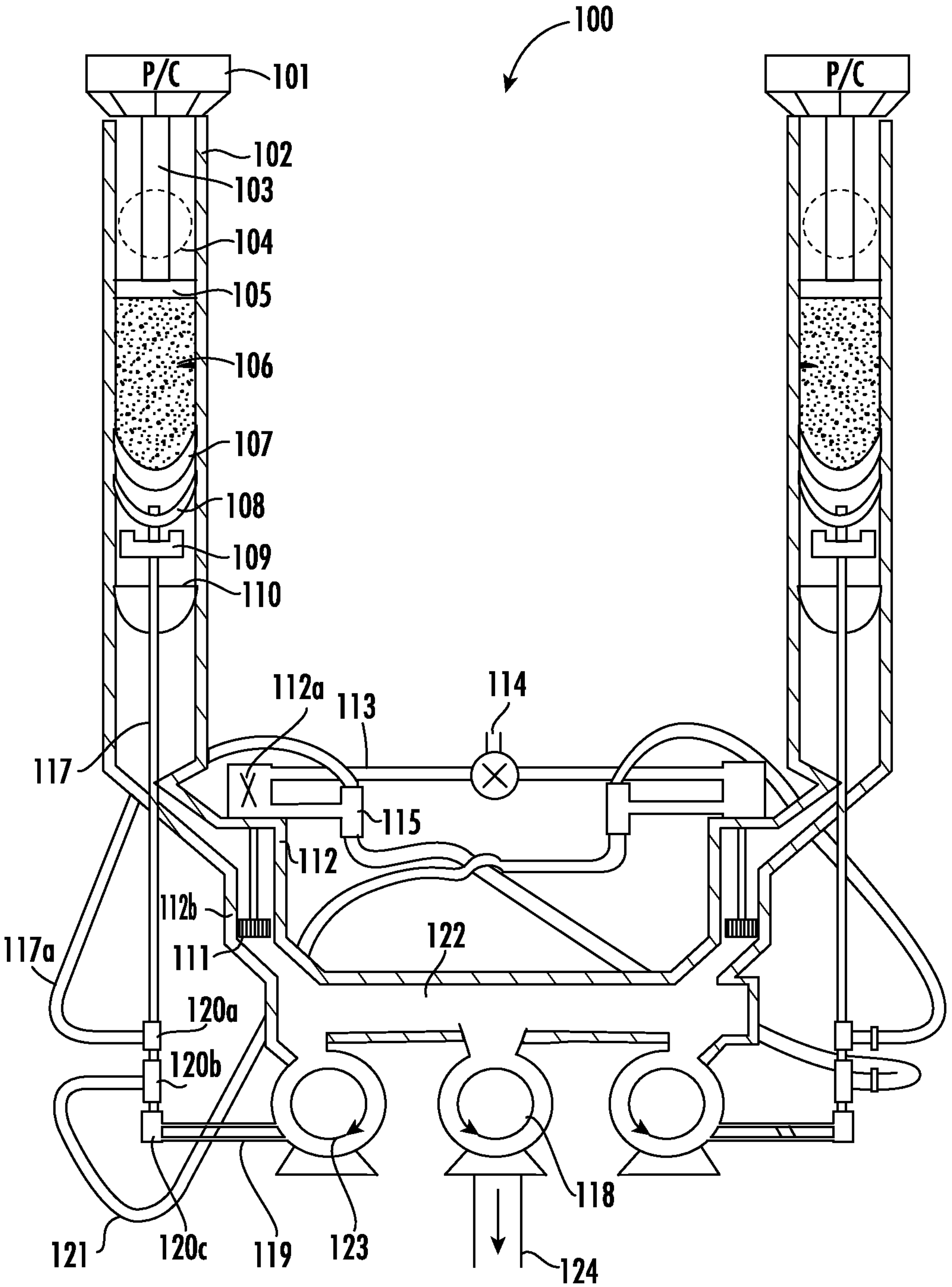
FIG. 1 illustrates a cross-sectional view of an exemplary embodiment of a rapid dissolution generator and mixing system where a pair of rapid dissolution generators is linked in balanced fluid flow to produce highly disperse highly concentrated solution.

U.S. Pat. No. 9,022,642 B2, application Ser. No. 13/458,113 is hereby incorporated by reference in its entirety.

In a first aspect of the technology described herein, there is provided rapid dissolution generator producing highly disperse and dissolved solutions; comprising a columnar first housing shell having, a powder support screen assembly extending across the interior of the housing shell and configured to support a column or package of a powdered or particulate material above the screen; a spray delivery assembly located below the screen assembly where the spray delivery assembly comprising a first or primary dispersion screen that is disposed between the support screen and a spray nozzle. The dispersion screen is connected to the nozzle and configured to spray through it to the support screen to dissolve a particulate material into solution. The liquid to be sprayed is passed through a conduit that runs through the nozzle and is in fluid communication with the spray nozzle and further extending through the bottom of the columnar housing shell lower end and terminating with an open end. There is also configured a pressure mechanism disposed above the screen assembly, and configured to apply a downward force on to the column of powder. A duct having an upper end in fluid communication with the lower end of the first housing shell interior surface, and a lower end, the duct further defined an fluid/solvent intake port, a dissolved power reservoir in fluid communication with the lower end of the duct where the manifold has at least two fluid output conduits; and a recirculation pump mounted in fluid communication with both the dissolved power reservoir and the spray delivery assembly at the conduit lower opening. This network forms a fluid communication loop between the powder to be dissolved in the dissolution screen, nozzle, columnar shell, duct, recirculation pump, and solution transfer line to conduit lower end.

In an additional aspect of the technology described herein, there is provided a rapid dissolution generator according to the first aspect of the technology described herein, above, wherein the powder support screen assembly comprises one or multiple components that can include without limitation: a metering screen having a first open area; and a plurality of support screens disposed above and below the metering screen, each of the support screens having a second open area greater than the first open area, of the metering screen(s). The powder support screen assembly can have a multiple of shapes depending on the application and include having a flat, convex or concave or superposition of shapes and profiles. Additionally, this aspect of the technology described herein includes at least one primary dispersion screen approximating the metering screen and a profile conforming to or different from the metering screen system and at least one spray nozzle that is a static or freely rotating nozzle and configured to discharge a shaped spray liquid pattern such as a cone-shaped, cylinder-shaped, concentric circular spray pattern or other pattern as desired or required to dissolve a particulate material(s) in the manner desired.

In another aspect of the technology described herein there is provided the rapid dissolution generator disclosed in the above aspects and further comprising: a solvent fill valve/system in fluid communication with and between at least one solvent distribution line and the spray nozzle and a fill valve with a control mechanism such as a controlled float that is disposed in the duct and coupled to the solvent fill valve such that the solvent fill valve is configured to open when the solvent or solution flow/add point drops below a set-point and closes when the float is at or above the set-point thereby controlling the quantity of liquid solution inside the rapid dissolution generator. Where there are multiple generators in a system, the fill valves are interconnected to the filling of each generator thereby providing a balanced flow of solvent in to the system.

In another aspect of the technology described herein, in addition to the above aspects, there is provided a transfer pump/system in fluid communication with one dissolved power reservoir port so as to receive solution discharged from the generator and where the transfer pump further has an output conduit for pumping a highly disperse solution to a product preparation mixing manifold wherein there is optionally at least one metering device connected between the dissolved power reservoir and the product preparation manifold.

In another aspect of the technology described herein, there is provided a mixing system that includes a product preparation manifold for mixing additional components to the solution discharged by the generator system and it comprises the dissolution generator system according to any of the previous aspects of the technology described herein in fluid communication with the product preparation manifold which generally comprises: a receiving and transfer conduit in fluid communication with the output conduit from the transfer pump. This transfer conduit has a plurality of distribution branches defined thereon for mixing product into a product mixing chamber in fluid communication with the plurality of distribution branches. The mixing chamber has an exit port where a mixed final product exits the system for packaging. There is a solvent delivery (from a source/supply of solvent under pressure) and distribution line having a plurality of fluid receiving branches. The branches each terminate with additive displacement valve, or termed a "Pressure Gravity Fill to Level Nozzle" or "Overflow Nozzle" in fluid communication with the distribution branches and in fluid communication with a plurality of additive containers wherein the valves further comprise a valve stem indexed inside to the bottom of and over the additive containers wherein a fluid communication path is established for to solvent flow from the solvent delivery and distribution line to the manifold branches, through the valves, into the bottom of the additive containers and up through a diluted additive conduit into the product mixing chamber to generate a final product and then this product to the product distribution conduit.

In an additional aspect of the technology described herein there is provide a method for preparing a product from at least one particulate or powdered material that is highly dispersed into a solvent and mixed with liquid additives to product a final product, this method comprising the steps of placing a column of powder in a housing above a screen assembly and using a pressure mechanism to apply a downward pressure (in a gravitational field) to the column of powder(s) from above the screen assembly. Then spraying solvent or solution from recycle or both at the powder in the column from a spray nozzle that is flowing through a primary dispersion screen assembly onto the powder support screen assembly, thereby dissolving exposed powder and producing a solution that falls through the primary dispersion screen or secondary dispersion screens and into the duct of the generator into the recycle loop or into the dissolved power reservoir and then product preparation manifold, mixing with liquid additives in the manifold and exiting the system into a packaging or product container.

Figure 3:
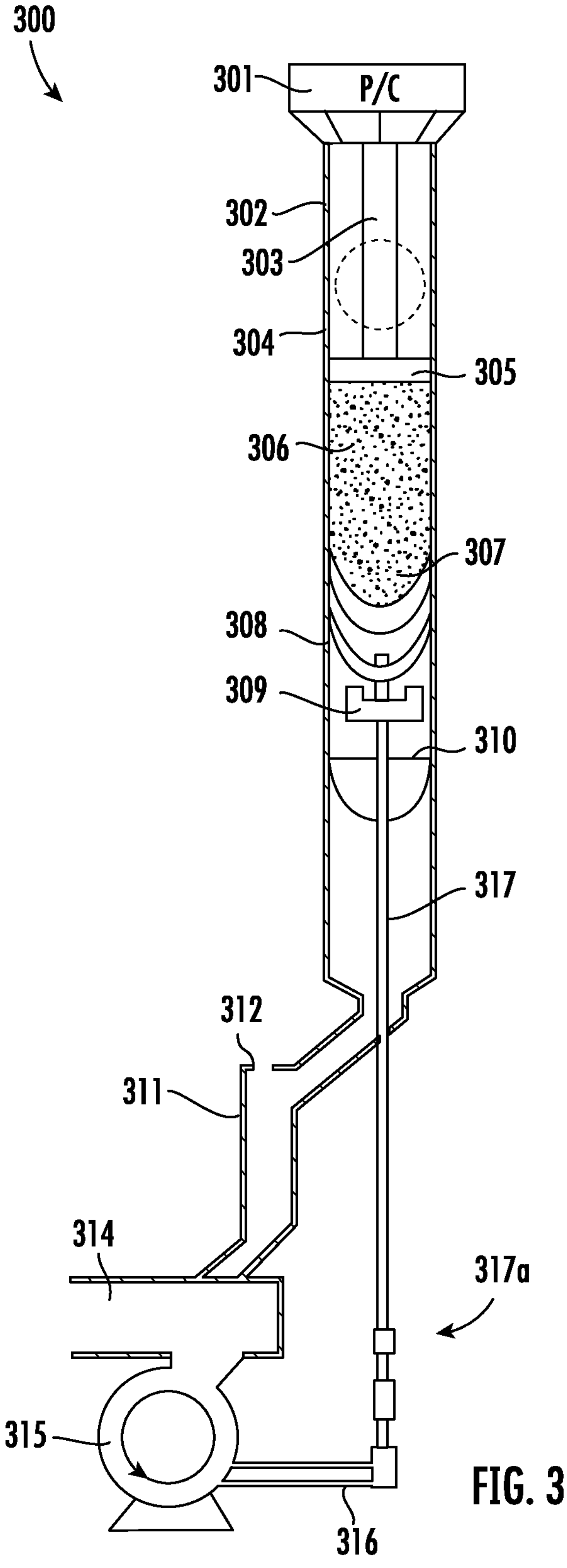
FIG. 3 illustrates a cross-sectional view of a rapid dissolution generator.
Figure 4:
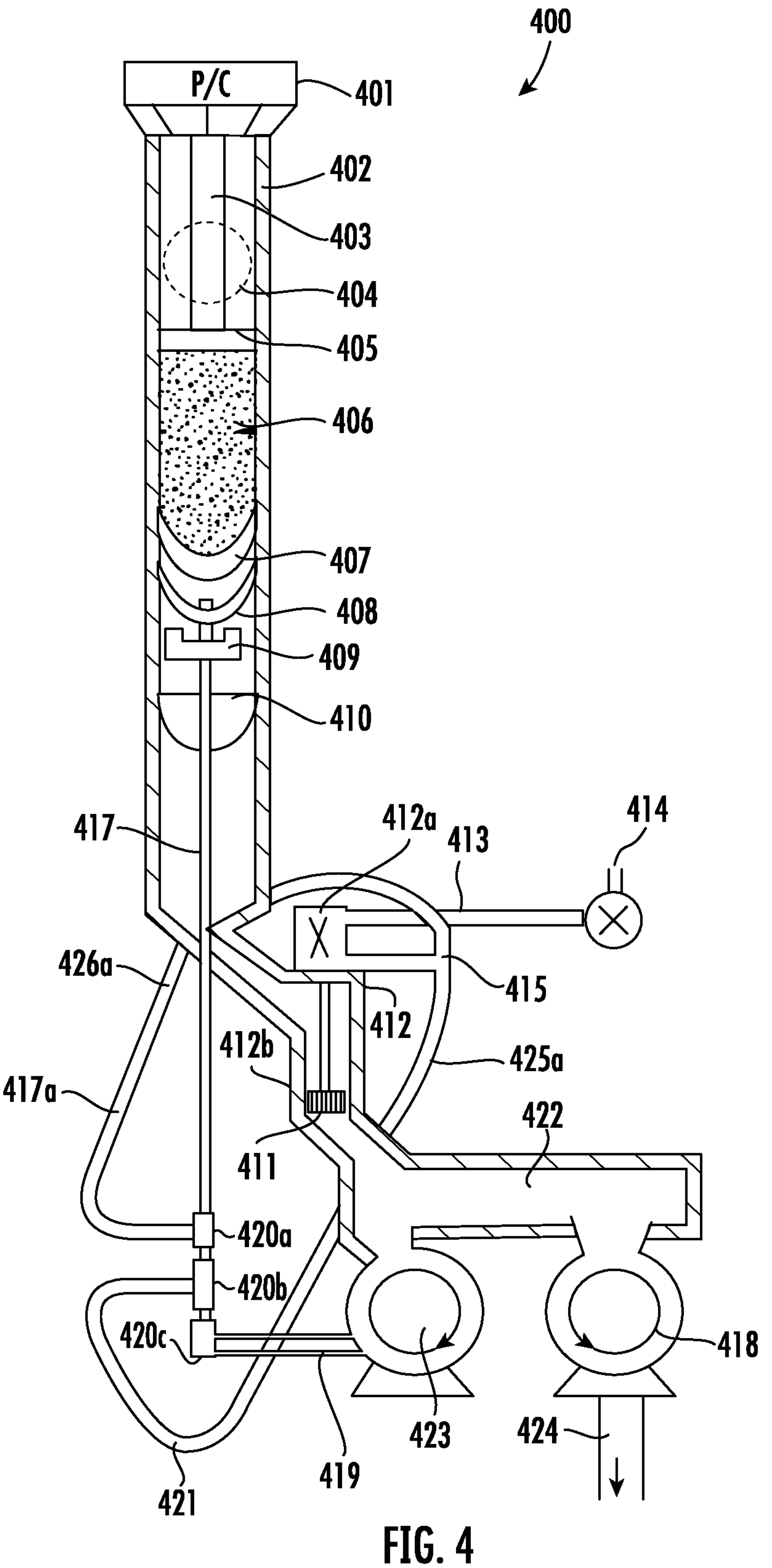
FIG. 4 illustrates a cross-sectional view of an exemplary embodiment of components of a rapid dissolution generator and dissolved power reservoir components.
Figure 5:
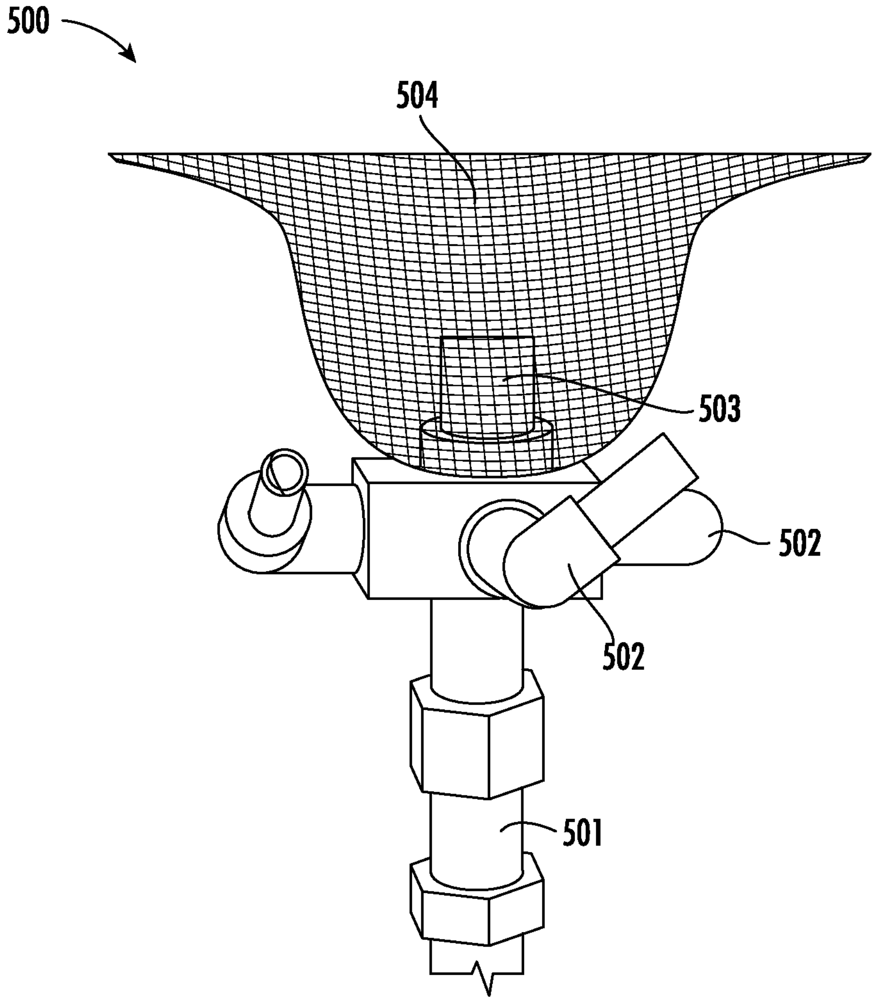
FIG. 5 illustrates one example of a spray nozzle assembly having a concave primary dispersion screen and rotary nozzle base having spray arms.

Turning now to the Figures, FIGS. 1, 3, and 4 all disclose increasingly detailed aspects of embodiments of a rapid dissolution generator and mixing system. Beginning with FIG. 3, there is provided a rapid dissolution generator 300: the dissolution generator 300 comprises a pressure generating and controlling mechanism 301; this mechanism/controller can be a constant or variable pressure mechanism and actuated by any number of known devices such as a telescoping device, geared track, pneumatic device and the like 303, 103, 403. The device is disposed on to a columnar first housing shell 302, 102, 402 having upper and lower ends, and interior and exterior surfaces. The housing can be constructed of any conventional chemical processing materials such as polyvinyl chloride (PVC) polymer piping, steels, including stainless steels, polyolefins of heavy wall construction or any such material that would be able to withstand a pressure producing powder disposed inside the generator. Inside, under the pressure device is a pressurizing device such as a flat or shaped piston 105, 305, 405; the piston is designed to pressurize a particulate or powder 106, 306, 406, which may dissolve in an intended solvent to generate a solution. Powders and particulates are introduced into the dissolution generator (100, 300, 400) by way of a door or port (104, 304, 404) built into the shell. The door may be sealable from external gas or air entering the dissolution generator. Inside the shell is provided a powder support screen assembly (107, 307, 407) extending across the interior of the housing shell and configured to support a column of powder or particulate material there above. Suitable screens and assemblies are available from Jelliff Specialty Screens and Screen Packs, Hickory NC, 1128 27th St. SE 28602. Next is provided a spray delivery assembly located below the screen assembly, the spray delivery assembly comprising an optional primary dispersion structure (108, 308, 408), for example a rotatable primary dispersion screen, disposed below the support screen, a spray nozzle (109, 309, 409) connected to and configured to spray through the primary dispersion structure. The spray nozzle can be either a stationary nozzle or rotary nozzle where rotary action is had by reaction force to solvent flowing into the conduit to the nozzle and out into the primary dispersion screen. Suitable nozzles are available from Mosmatic Corporation 8313 196th Ave. Bristol, Wisconsin. One suitable type of rotary nozzle has upwardly pointing spray arms and/or a central spray nozzle that alone or together spray a patterned spray for dissolution of the powder charge. The rotary nozzle is mounted on a conduit extending through the columnar housing shell lower end and terminating in an open end. FIG. 5 illustrates one example construction for a stationary or rotary nozzle 500 useful with the dissolution generator; nozzle 500 includes a rotary or stationary coupling 501; spray nozzle 502 having a plurality of spray arms mounted to a central rotatable hub, a central spray nozzle 503; and a primary dispersion screen 504. Optionally, rotation of the spray nozzle may be driven by other means such as one or more electric motors, internal combustion engines, mechanical power takeoff drives, pneumatic means, or hydraulic means.

FIGS. 1, 3 and 4 at no. 110, 310 and 410 disclose an optional high dispersion screen that can be disposed between the nozzle and the duct entrance to the columnar housing lower end and is mounted on the conduit like the nozzle. An additional nozzle is considered to be within the scope of the concept described herein where useful to further disperse solutions emanating from the primary dissolution step above. The dissolution generator 100, 300, 400, further comprise a duct 111, 311, 411 having upper end in fluid communication with the lower end of the first housing shell interior surface, a lower end, the duct further defining an fluid intake port 112, 312, 412 adaptable for mounting a fill valve and fluid float sensor system such as a pressure sensitive sensor 112*a*, 412*a*. Additionally FIGS. 1, 3, 4 include a dissolved power reservoir (122, 314, 422) in fluid communication with the lower end of the duct, the manifold having at least two fluid output conduits; and a recirculation pump (123, 423, 315) mounted in fluid communication with both the dissolved power reservoir (122, 314, 422) and the spray delivery assembly conduit lower opening (117*a*, 317*a*, 417*a*) from solution transfer lines (119, 316, 419) the thereby forming a fluid communication loop between the fluid port, duct, recirculation pump, solution transfer line, and conduit to the nozzle.

In an exemplary embodiment, the rapid dissolution generator powder support screen assembly 107, 307, 407 comprises: a metering screen having a first open area; and support screens disposed above and below the metering screen, each of the support screens having a second open area greater than the first open area, said metering screen having a flat, convex or concave profile. The screen materials need be of sufficient strength to withstand the pressure transmitted through the particulate or powder. The primary dispersion screen 108, 308, 408 has an open area approximating the metering screen and a profile conforming to or different from the metering screen.

One kind of primary dispersion structure is described above. However, various types of primary dispersion elements may be used. The purpose and function of each primary dispersion structure is to create a shearing force which promotes break-up of powder or particulate, dispersion into the solvent, and mixing. A common feature of the primary dispersion structure is two or more mechanical elements in relatively close proximity which produce movement relative to each other. For example, a moving element may be positioned closely to a stationary element. If desired, two or more moving elements may be provided. In addition to those described elsewhere herein, FIGS. 6-11 illustrate non-limiting examples of primary dispersion structures. As used herein when describing the primary dispersion structure elements, the term "close proximity" refers to a distance of about 2.5 mm (0.10 inch) or less.

Figure 6:
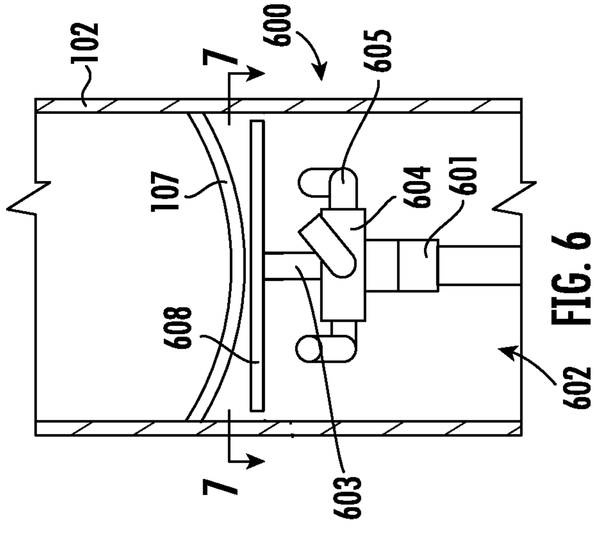
FIG. 6 is a schematic, partially-sectioned diagram of an exemplary dissolution generator and nozzle assembly.
Figure 7:
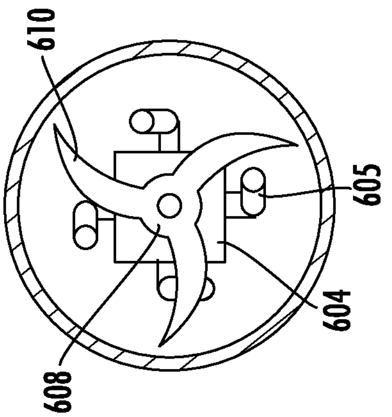
FIG. 7 is a view taken along lines 7-7 of FIG. 6.

FIGS. 6 and 7 illustrate an assembly 600 including a spray nozzle 602 comprising a freely rotatable central hub 604 having one or more spray arms 605 extending from the central hub 604, the spray arms 605 configured and oriented so as to produce a reaction force that rotates the spray nozzle 602 in response to solvent being discharged therefrom. A central spray nozzle 603 extends upwards from the central hub 604. The central hub 604 is mounted to a pipe or conduit which supplies pressurized solvent by a rotary union 601 or other coupling which conducts fluid while permitting rotation.

The assembly 600 is mounted within a housing shell as described above (e.g., 102, 302, 402), near a powder support screen assembly as described herein (e.g. 107, 307, 407). The assembly 600 includes a blade 608 having a plurality of generally radially-extending arms 610. The blade 608 may be relatively thin and formed from a rigid material such as stainless steel. The blade may be planar or may have a concave or convex shape. The blade 608 is shown as being physically mounted to an extended portion of the central spray nozzle 603, which provides physical support and causes the blade 608 to rotate in unison with the central hub 604 in operation.

The blade 608 may be positioned in close physical proximity to the powder support screen assembly. Ideally for best shearing action, the blade 608 would be placed in contact with or nearly in contact with the powder support screen assembly. In practice, the powder support screen assembly may not be perfectly rigid and/or may have a non-uniform shape and/or may be subject to sagging or deflection. Accordingly the blade 608 may be spaced away from the powder support screen assembly a distance selected to prevent interference between the blade 608 and the powder support screen assembly. The blade 608 acting in concert with the powder support screen assembly is one example of a "primary dispersion element".

Figure 8:
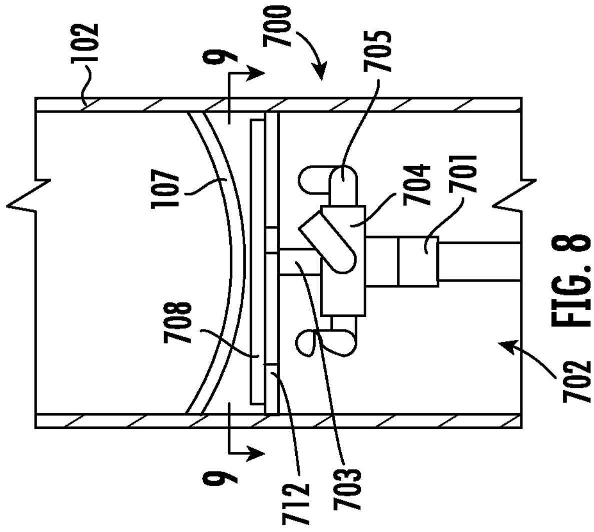
FIG. 8 is a schematic, partially-sectioned diagram of an exemplary dissolution generator and nozzle assembly.
Figure 9:
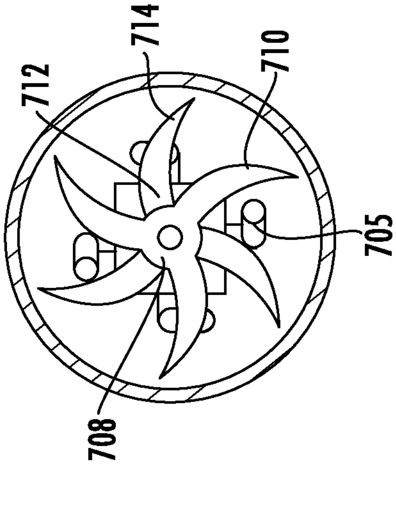
FIG. 9 is a view taken along lines 9-9 of FIG. 8.

FIGS. 8 and 9 illustrate an assembly 700 including a spray nozzle 702 comprising a freely rotatable central hub 704 having one or more spray arms 705 extending from the central hub 704, the spray arms 705 configured and oriented so as to produce a reaction force that rotates the spray nozzle 702 in response to solvent being discharged therefrom. A central spray nozzle 703 extends upwards from the central hub 704. The central hub 704 is mounted to a pipe or conduit which supplies pressurized solvent by a rotary union 701 or other coupling which conducts fluid while permitting rotation.

The assembly 700 is mounted within a housing shell as described above (e.g., 102, 302, 402), near a powder support screen assembly as described above (e.g. 107, 307, 407). The assembly 700 includes a blade 708 having a plurality of generally radially-extending arms 710. The blade 708 may be relatively thin and formed from a rigid material such as stainless steel. The blade 708 may be planar or may have a concave or convex shape. The blade 708 is shown as being physically mounted to an extended portion of the central spray nozzle 703, which provides physical support and causes the blade 708 to rotate in unison with the central hub 704 in operation.

A stationary blade 712 is provided which is positioned in close physical proximity to the rotating blade 708. The stationary blade 712 includes one or more generally radially-extending arms 714. The stationary blade 712 may be relatively thin and formed from a rigid material such as stainless steel. Ideally for best shearing action, the blade 708 would be placed in contact with or nearly in contact with the stationary blade 712, either immediately above or immediately below. In operation, the relative movement between the stationary blade 712 and the rotating blade 708 produces a shearing effect. The rotating blade 708 acting in concert with the stationary blade 712 is another example of a "primary dispersion element".

Figure 10:
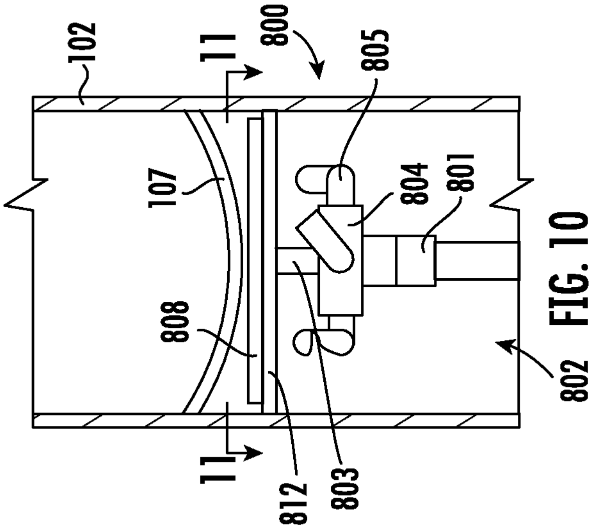
FIG. 10 is schematic, partially-sectioned diagram of an exemplary dissolution generator nozzle assembly.
Figure 11:
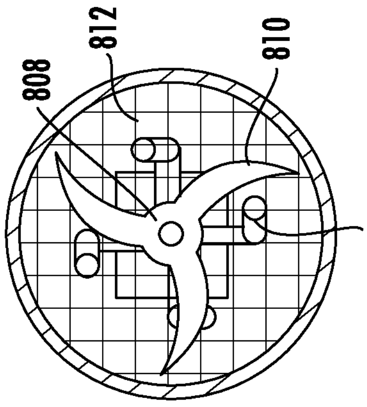
FIG. 11 is a view taken along lines 11-11 of FIG. 10.

FIGS. 10 and 11 illustrate an assembly 800 including a spray nozzle 802 comprising a freely rotatable central hub 804 having one or more spray arms 805 extending from the central hub 804, the spray arms 805 configured and oriented so as to produce a reaction force that rotates the spray nozzle 802 in response to solvent being discharged therefrom. A central spray nozzle 803 extends upwards from the central hub 804. The central hub 804 is mounted to a pipe or conduit which supplies pressurized solvent by a rotary union 801 or other coupling which conducts fluid while permitting rotation.

The assembly 800 is mounted within a housing shell as described above (e.g., 102, 302, 402), near a powder support screen assembly as described above (e.g. 107, 307, 407). The assembly 800 includes a blade 808 having a plurality of generally radially-extending arms 810. The blade 808 may be relatively thin and formed from a rigid material such as stainless steel. The blade 808 may be planar or may have a concave or convex shape. The blade 808 is shown as being physically mounted to an extended portion of the central spray nozzle 803, which provides physical support and causes the blade 808 to rotate in unison with the central hub 804 in operation.

A stationary screen 812 is provided which is positioned in close physical proximity to the rotating blade 808. The stationary screen 812 includes a plurality blocking element such as grids or wires defining an array of openings having a selected size. Ideally for best shearing action, the blade 808 would be placed in contact with or nearly in contact with the stationary screen 812, either immediately above or immediately below. In operation, the relative movement between the stationary screen 812 and the rotating blade 808 produces a shearing effect. The rotating blade 808 acting in concert with the stationary screen 812 is another example of a "primary dispersion element". In another alternative embodiment (not illustrated), the paired elements comprising the rotating blade 708 or 808 described above and the accompanying stationary blade or screen 712 or 812 described above, could be mounted underneath the central hub, that is, on the opposite side of the nozzle to the power support screen assembly. This configuration completely avoids any possible interference with the spray pattern of the rotating nozzle.

Described above are several primary dispersion elements which include a moving structure. These have been described as being driven by operation of rotary nozzle, which is a practical and convenient drive means. Optionally, the moving structures of the primary dispersion elements may be driven by other means such as one or more electric motors, internal combustion engines, mechanical power takeoff drives, pneumatic means, or hydraulic means.

One exemplary spray nozzle is a static nozzle configured to discharge a cone-shaped, cylinder-shaped or concentric circular spray pattern. Another exemplary spray nozzle comprises: a freely rotatable central hub; one or more spray arms extending from the central hub, the spray arms configured and oriented so as to produce a reaction force that rotates the spray nozzle in response to solvent being discharged therefrom. Such nozzles are disclosed in U.S. Pat. No. 9,022,642 B2 incorporated by reference supra.

In other example embodiments, the recirculation pump 123, 315, 423 is air or gas driven. If required, the pumps of embodiments of the invention may be driven by a fuel-burning engine or electric motors.

As illustrated in FIGS. 1 and 4, a solvent fill valve (112*a*, 412*a*) may be in fluid communication with and between at least one pressurized solvent distribution line (113, 413) and the spray nozzle (109, 409); and a fill valve controlled float (112*b*, 412*b*) disposed in the duct (111, 411) and coupled to the solvent fill valve (114, 414) wherein the solvent fill valve is configured to open when the solvent or solution flow drops below a set-point and close when the float is at or above the set-point.

In an exemplary embodiment, the pressure controller (101, 301, 401) comprises a slidable piston (105, 305, 405) disposed above the screen assembly (107, 307, 407) in a leak resistant/proof and slidable relationship as can be determined by one of ordinary skill in the art, with the columnar housing shell 102, 302, 402, and the pressure transfer device 103, 303, 403 connected to and mounted above the piston. Other embodiments of the same include: a pressure transfer device comprises a telescoping piston-cylinder apparatus, a geared shaft apparatus, or a pneumatically driven cylinder apparatus; such mechanical configurations conventional in the pressure application arts. The columnar housing shell 102, 302, 402 has an access port (104, 304, 404) defined in the housing shell, and includes a movable, sealable door included over the access port where the door movable between conventional open and closed positions, where the open position exposes the interior of the columnar housing between the screen assembly and the pressure transfer device piston to provide access to insert a dissolvable powder or particulate-containing cartridge, said cartridge conformable to the interior of the columnar housing between the screen assembly and pressure transfer device piston.

Figure 2:
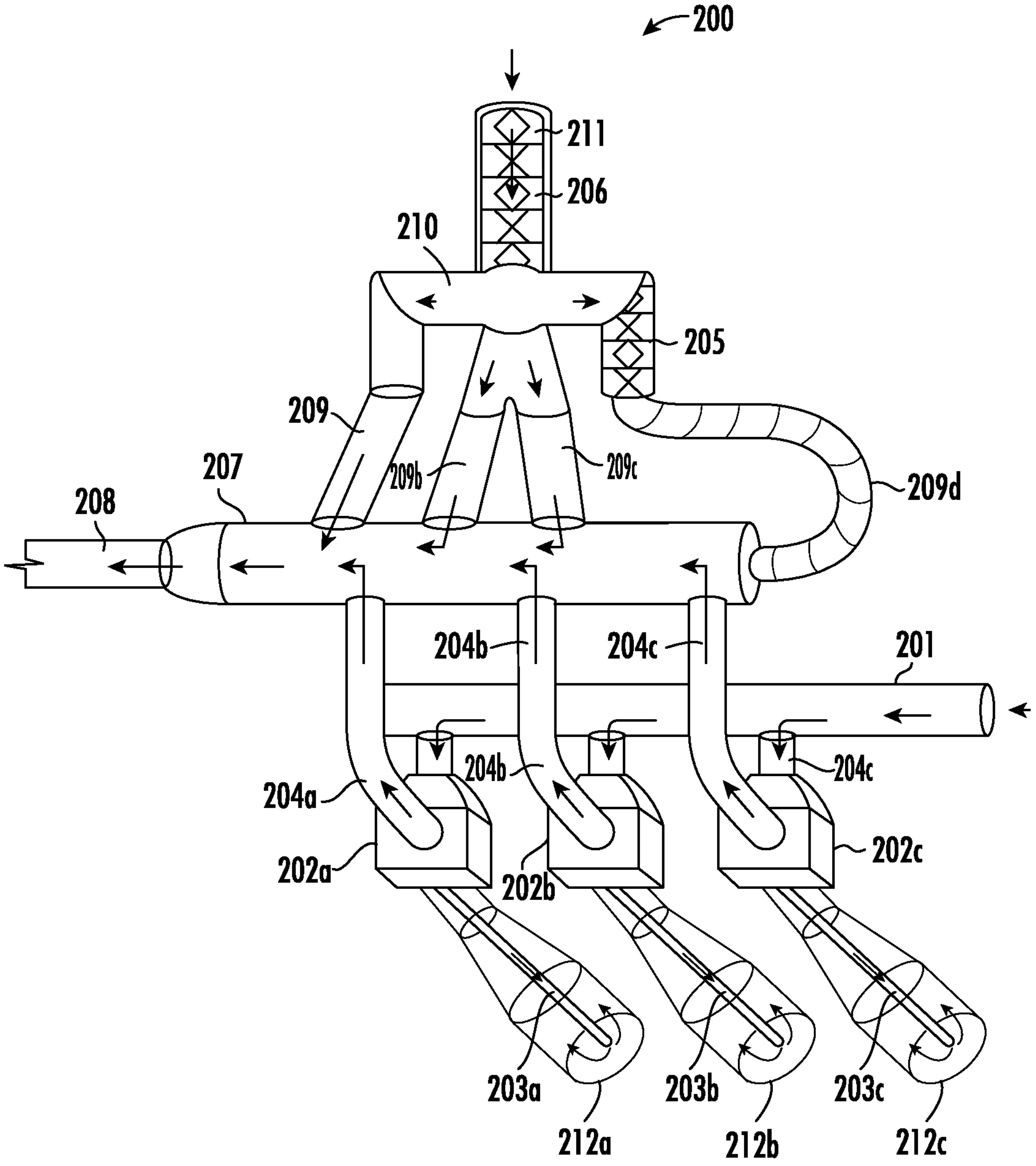
FIG. 2 illustrates a perspective view of an exemplary embodiment of a product preparation manifold useful with a rapid dissolution generator.

The present dissolution generator system requires a solution pump, such as an air powered transfer pump (124, 418) in fluid communication with one dissolved power reservoir port to receive solution discharged from the generator has an output conduit for pumping a highly disperse solution to a product preparation manifold FIG. 2, 200 wherein there is optionally at least one metering device connected between the dissolved power reservoir and the product preparation manifold. In a useful embodiment of the rapid dissolution generator system in the fluid communication loop and/or the product preparation manifold, one or more static mixing devices can be useful to retain a high dispersion. Such elements are shown in FIG. 2, 205, 206. Suitable pumps are commercially available from Flo-Jet Corporation, 20 Icon, Foothill Ranch CA 92619, USA.

In another useful embodiment of the rapid dissolution generator system, two or more separate rapid dissolution generators in fluid communications through solvent supply and dissolved power reservoir, wherein a powder charged to the generators may be the same or different and the screens may be the same or different. The systems may be adapted for balance solvent intake via flow through a fluid "tee"-inline with the pressurized solvent (e.g. water) (114, 414). The generator systems may be used with heated solvent/water, for example in a temperature range being from about room temperature to about 150 F, or in a range from about 100 F to about 130 F. an exemplary temperature range for solvents useful with the dissolution generator and mixing system is about 120-135 degrees F.

The rapid dissolution generator mixing system may include a mixing system; one non-limiting example of a mixing system is illustrated in (FIG. 2, 200) comprising: the dissolution generator system in fluid communication with a product preparation manifold 200 where the product preparation manifold comprises: a) a receiving and transfer conduit 211 in fluid communication with the output conduit of the transfer pump 424, 124; the transfer conduit having a plurality of distribution branches 209 *a, b, c, d* a product mixing chamber 207 in fluid communication with the plurality of distribution branches, the mixing chamber further defined by an product exit port 208; a solvent delivery 201 and distribution line having a plurality of fluid receiving branches, the branches terminated with; e) a plurality of additive displacement valves (additive displacement valve, or termed a "Pressure Gravity Fill to Level Nozzle" or "Overflow Nozzle" as known in the art and available from Packaging Dynamics 35B Carlough Rd., Bohemia, NY 11716) 202*a, b, c*; 203*a, b, c* in fluid communication with the distribution branches and in fluid communication with a plurality of additive containers 212 *a, b, c* wherein the valves further comprise a compression spring-loaded valve stem 203 indexed inside and over the additive containers wherein a fluid communication path is established for solvent flow from the solvent delivery and distribution line to the branches, through the valves into the bottom of the additive containers through a diluted additive conduit into the product mixing chamber to the product distribution conduit. The solvents can be organic solvents, water, mixtures, acids, alkali materials, polymer, mineral-containing liquids and the like. An example liquid solvent is water, for example distilled, reverse osmosis ("RO"), or tap water as available pressurized and available via utility services. The mixing system product preparation manifold may further comprise a plurality of static mixing devices 205 and 206 disposed inside the manifold. It will be understood by those of skill in the art that other configurations of mixing solutions from the generator and the product preparation manifold will provide useful results. In particular the solution distribution branches 209 *a, b, c*, may be in alternative positions either adjacent or opposite, in non-limiting fashion, the diluted additives conduits 204, *a, b, c* can be more numerous if the resulting solutions are more completely dispersed/mixed and stable. It will be appreciated that additives can be any manner of soluble cleaners, waxes, polymers, surfactants, oils, and the like useful for preparing product mixtures that are highly dispersed. Suitable systems are further described below.

Figure 12:
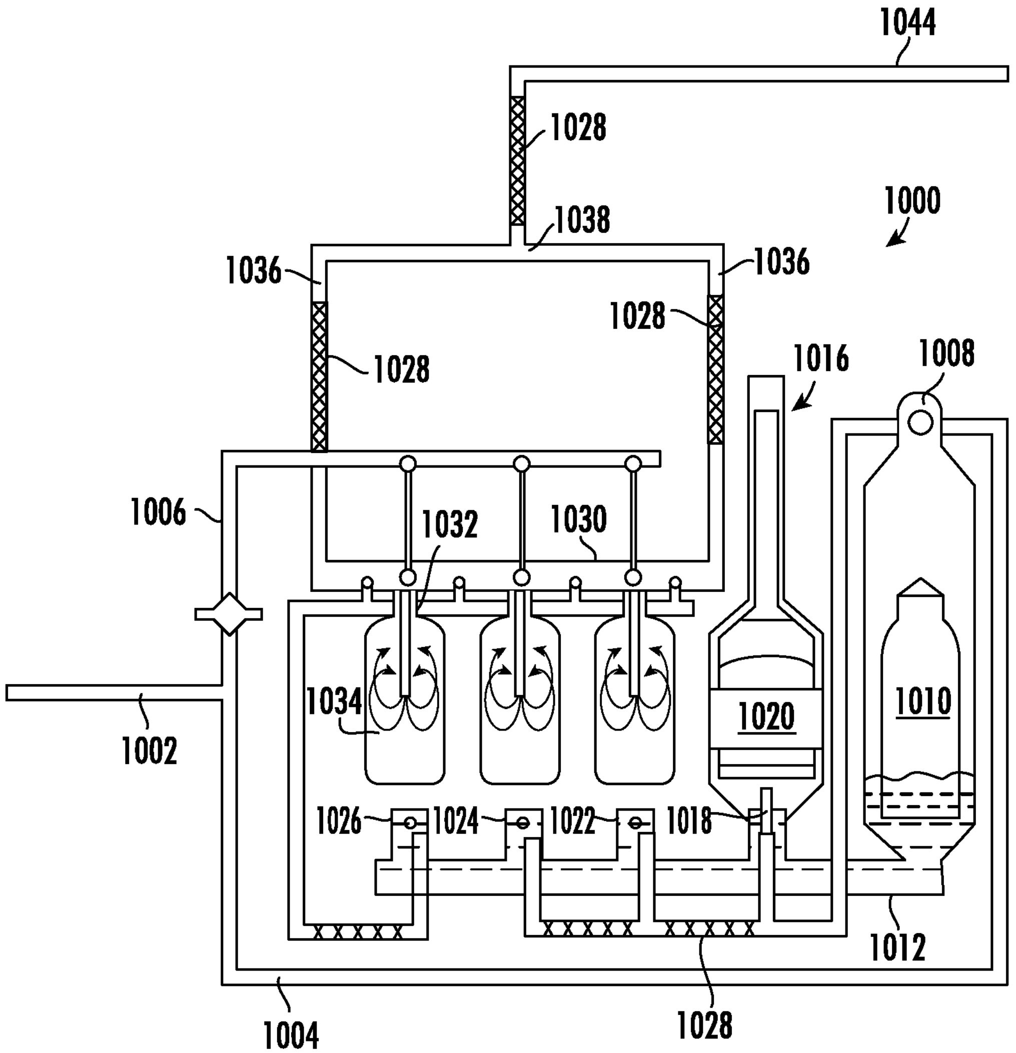
FIG. 12 is a schematic diagram of an exemplary dissolution generator and mixing apparatus.

FIG. 12 illustrates an exemplary dissolution generator and mixing system which is intended as a further example of one possible configuration of the concepts described above. The apparatus 1000 includes fresh water supply line 1002 which is divided by a tee into first and second supply lines 1004, 1006 respectively. The first supply line 1004 is coupled to a float valve 1008 whose operation is controlled by a float 1010 disposed in a dissolved powder reservoir 1012. From the float valve 1008, a conduit 1014 leads to a dissolution generator 1016 of the type described above. Among other elements, the dissolution generator 1016 includes a nozzle 1018 which is supplied by the conduit 1014 and a powder chamber 1020 for receiving powder or particulate.

The dissolution generator 1016 discharges through a duct (not labeled) into the dissolved powder reservoir 1012. The dissolved powder reservoir 1012 is equipped with circulation pumps 1022, 1024, 1026. In the illustrated example illustrated example, two of the circulation pumps 1022, 1024 are configured to recirculate fluid containing dissolved powder from the dissolved powder reservoir 1012 back into the inlet of the nozzle 1018. As illustrated, the recirculation conduits may incorporate static mixing devices 1028.

The remaining circulation pump 1026 is configured to discharge fluid containing dissolved powder from the dissolved powder reservoir 1012 into a mixing chamber 1030.

The second supply line 1006 is coupled to additive displacement valves 1032 of the type described above, which are coupled to liquid containers 1034, for example conventional 1-gallon jugs. As described above, the additive displacement valve 1032 are effective to purge liquid contained in the liquid containers 1034 into the mixing chamber 1030. Within the mixing chamber 1030, the fluid containing dissolved powder and the liquid from the liquid containers 1034 mixes together to conform a complete product. The product exits the mixing chamber 1030 through one or more discharge pipes 1036 which may include additional static mixers 1028. The discharge pipes 1036 join at a tee 1038, and an outlet pipe 1044 for final product exits the tee 1038. It two may include one or more static mixers 1028. The outlet pipe 1044 may be connected to or placed directly over the container for receiving final product such as a drum, barrel, or tank (not shown).

One exemplary method of dissolving powder into a liquid comprises: placing a column of powder in a housing above a screen assembly; using a pressure mechanism to apply a downward pressure to the column of powder above the screen assembly; spraying solvent or solution or both at the powder from a spray nozzle through a primary dispersion screen assembly through a powder support screen assembly, thereby dissolving exposed powder and producing a solution wherein the screen assembly has a flat, concave or convex shape; wherein the liquid-powder solution is discharged from the housing into a product-mixing manifold and further wherein prior to spraying the powder, inserting a powder-containing soluble cartridge into the housing, the cartridge comprising. Heating the solvent/water is helpful and the method described herein contemplates having an insulated system to control and maintain a particular temperature.

The apparatus described herein can easily be modified to change products based on varying local geographic needs. For example, in areas where environmental concerns may be of particular importance, the products may be blended using environmental friendly ingredients. Water quality also varies throughout the country and the recipes for making the products may change based on water hardness, water pH, iron level of the water, etc. Thus, the formula in one geographic for detergent may differ from a dish detergent for a different geographical area. The product selection could vary, depending on local preferences. Buying preferences such as window cleaners, liquid pot and pan detergents, and all-purpose cleaners vary geographical, thus the availability of these products could be changed. Choice of fragrances also is local specific, so different fragrances could be used in different geographical locations.

The pre-measured or pre-formulated raw chemical materials or mixtures introduced in the product preparation manifold additive bottles/containers may comprise liquid raw material, particulate/solution raw material, or both. The liquid raw materials may include at least one of an alkaline or acid (e.g., sodium hydroxide), liquid chelate, surfactant, solvent, polymer, stabilizing agent, viscosity control agent, fragrance, dye, and combinations thereof.

Examples of surfactants for the liquid additive bottles to mix include, but are not limited to, nonionic surfactants, cationic surfactants, anionic surfactants, amphoteric surfactants, and combinations thereof. Nonionic surfactants are conventionally produced by condensing ethylene oxide with a hydrocarbon having a reactive hydrogen atom, e.g., a hydroxyl, carboxyl, amino, or amido group, in the presence of an acidic or basic catalyst. Nonionic surfactants may have the general formula RA $(CH_2CH_2O)_nH$ wherein R represents the hydrophobic moiety, A represents the group carrying the reactive hydrogen atom and n represents the average number of ethylene oxide moieties. R may be a primary or a secondary, straight or slightly branched, aliphatic alcohol having from about 8 to about 24 carbon atoms. A more complete disclosure of nonionic surfactants can be found in U.S. Pat. No. 4,111,855 issued to Barrat, et al. and U.S. Pat. No. 4,865,773, Kim et al., issued Sep. 12, 1989, which are hereby incorporated by reference. Other nonionic surfactants include ethoxylated alcohols or ethoxylated alkyl phenols wherein A is a hydroxyl group. In the case of ethoxylated alcohols, R is an aliphatic hydrocarbon radical that is either straight or branched, primary or secondary and may contain from about 8 to about 18 carbon atoms and have an n value from about 2 to about 18. In the case of ethoxylated alkyl phenols, R is an alkyl phenyl radical in which the alkyl group may contain from about 8 to about 15 carbon atoms in either a straight chain or branched chain configuration and have an n value from about 2 to about 18. Examples of such surfactants are listed in U.S. Pat. No. 3,717,630, Booth, issued Feb. 20, 1973, U.S. Pat. No. 3,332,880, Kessler et al, issued Jul. 25, 1967, U.S. Pat. No. 4,284,435, Fox, issued Aug. 18, 1981, which are hereby incorporated by reference. Examples of ethoxylated alkyl phenols also include nonyl phenol condensed with about 9 moles of ethylene oxide per mole of nonyl phenol, and dodecyl phenol condensed with about 8 moles of ethylene oxide per mole of dodecyl phenol. Examples of ethoxylated alcohols include the condensation product of myristyl alcohol condensed with about 9 moles of ethylene oxide per mole of alcohol, and the condensation product of about 7 moles of ethylene oxide with coconut alcohol (a mixture of fatty alcohols with alkyl chains varying in length from 10 to 14 carbon atoms). Examples of commercially available ethoxylated alcohols and alkyl phenols include the following: Tergitol 15-S-9 marketed by Union Carbide Corporation; Neodol 45-9, Neodol 23-6.5, Neodol 45-7 and Neodol 45-4 marketed by Shell Chemical Company; Kyro EOB marketed by The Procter and Gamble Company; Berol® 260 and Berol® 266 marketed by Akzo Nobel; and T-DET® 9.5 marketed by Harcros Chemicals Incorporated. A mixture of nonionic surfactants may also be used.

Cationic surfactants may include those containing non-quaternary nitrogen, those containing quaternary nitrogen bases, those containing non-nitrogenous bases and combinations thereof. Such surfactants are disclosed in U.S. Pat. No. 3,457,109, Peist, issued Jul. 22, 1969, U.S. Pat. No. 3,222,201, to Boyle, issued Dec. 7, 1965 and U.S. Pat. No. 3,222,213, Clark, issued Dec. 7, 1965, which are hereby incorporated by reference. One category of cationic surfactants may include quaternary ammonium compounds with the general formula RXYZ $N^+A^-$, wherein R is an aliphatic. or cycloaliphatic group having from 8 to 20 carbon atoms and X, Y and Z are members selected from the group consisting of alkyl, hydroxylated alkyl, phenyl and benzyl. $A^-$ is a water soluble anion that may include, but is not limited to, a halogen, methosulfate, ethosulfate, sulfate and bisulfate. The R group may be bonded to the quaternary group through hetero atoms or atom groups such as —O—, —COO—, —CON—, —N—, and —S—. Examples of such compounds include, but are not limited to, trimethyl-hexadecyl-ammonium sulfate, diethyl-octadecyl-phenyl-ammonium sulfate, dimethyl-dodecyl-benzyl-ammonium chloride, octadecylamino-ethyl-trimethyl-ammonium bisulfate, stearylamido-ethyl-trimethyl-ammonium methosulfate, dodecyloxy-methyl-trimethyl-ammonium chloride, cocoalkylcarboxyethyl-di-(hydroxyethyl)-methyl-ammonium methosulfate, and combinations thereof. Another category of cationic surfactants may be of the di-long chain quaternary ammonium type having the general formula $XYRR_1N^+ A^-$, wherein X and Y chains may contain an average of from about 12 to about 22 carbon atoms and R and $R_1$ may be hydrogen or $C_1$ to $C_4$ alkyl or hydroxyalkyl groups. Although X and Y may contain long chain alkyl groups, X and Y may also contain hydroxy groups or may contain heteroatoms or other linkages, such as double or triple carbon-carbon bonds, and ester, amide, or ether linkages, as long as each chain falls within the above carbon atom ranges. An additional category of cationic surfactant may include ethoxylated and bis(ethoxylated) ammonium quaternary compounds.

Synthetic anionic surfactants can be represented by the general formula $R_1SO_3M$ wherein $R_1$ represents a hydrocarbon group selected from the group consisting of straight or branched alkyl radicals containing from about 8 to about 24 carbon atoms and alkyl phenyl radicals containing from about 9 to about 15 carbon atoms in the alkyl group. M is a salt forming cation which typically is selected from the group consisting of sodium, potassium, ammonium, monoalkanolammonium, dialkanolammonium, trialkanolammonium, and magnesium cations and mixtures thereof. An example of an anionic surfactant is a water-soluble salt of an alkylbenzene sulfonic acid containing from about 9 to about 15 carbon atoms in the alkyl group. Another synthetic anionic surfactant is a water-soluble salt of an alkyl polyethoxylate ether sulfate wherein the alkyl group contains from about 8 to about 24. Other suitable anionic surfactants are disclosed in U.S. Pat. No. 4,170,565, Flesher et al, issued Oct. 9, 1979, incorporated herein by reference. Other suitable anionic surfactants can include detergents and fatty acids containing from about 8 to about 24 carbon atoms. Other useful anionic surfactants include the water-soluble salts, particularly the alkali metal, ammonium and alkylolammonium (e.g., monoethanolammonium or triethanolammonium) salts, of organic sulfuric reaction products having in their molecular structure an alkyl group containing from about 10 to about 20 carbon atoms and a sulfonic acid or sulfuric acid ester group. (Included in the term "alkyl" is the alkyl portion of aryl groups.) Examples of this group of synthetic surfactants are the alkyl sulfates, especially those obtained by sulfating the higher alcohols ($C_8$-$C_{18}$ carbon atoms) such as those produced by reducing the glycerides of tallow or coconut oil; and the alkylbenzene sulfonates in which the alkyl group contains from about 9 to about 15 carbon atoms, in straight chain or branched chain configuration, e.g., those of the type described in U.S. Pat. Nos. 2,220,099 and 2,477,383 both of which are hereby incorporated by reference. Especially valuable are linear straight chain alkylbenzene sulfonates in which the average number of carbon atoms in the alkyl group is from about 11 to 14.

Other anionic surfactants include the water-soluble salts of paraffin sulfonates containing from about 8 to about 24 carbon atoms; alkyl glyceryl ether sulfonates, especially those ethers of $C_8$-$C_{18}$ alcohols (e.g., those derived from tallow and coconut oil); alkyl phenol ethylene oxide ether sulfates containing from about 1 to about 4 units of ethylene oxide per molecule and from about 8 to about 12 carbon atoms in the alkyl group; and alkyl ethylene oxide ether sulfates containing about 1 to about 4 units of ethylene oxide per molecule and from about 10 to about 20 carbon atoms in the alkyl group. Other useful anionic surfactants include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

Furthermore, other anionic surfactants include $C_{10}$-$C_{18}$ alkyl sulfates and alkyl ethoxy sulfates containing an average of up to about 4 ethylene oxide units per mole of alkyl sulfate, $C_{10}$-$C_{13}$ linear alkylbenzene sulfonates, and mixtures thereof. Unethoxylated alkyl sulfates may also be used. Chelating agents may form another component of the premeasured raw chemical material. Chelating agents may soften the feed water, bind insoluble metal ions present in the traffic film, increase surfactant activity and reduce the redeposition of soil. Examples of chelating agents include, but are not limited to, trisodium nitrilotriacetate, trisodium hydroxyethyl ethylene diaamine tetraacetate, tetrasodium ethylene diamine tetraacetate, sodium salt of diethanol glycine, and sodium salt of polyacrylic acid.

Additionally, tripolyphosphate and pyrophosphate salts may be used as chelating agents. Tripolyphosphate salts have the general formula $X_5P_3O_{10}$ wherein X is an alkali metal cation. Tripolyphosphate may act as a water softener by sequestering the $Mg^{2+}$ and $Ca^{2+}$ in hard water, and may increase surfactant efficiency by lowering the critical micelle concentration and suspending and peptizing dirt particles. Pyrophosphate salts have the general formula $X_4P_2O_7$ wherein X is an alkali metal cation. Mixtures of chelating agents may also be used. Additional materials useful in the present method include: non-ionic wetting agents that are oxalated, displaying a relatively low cloud point and may be non-foaming Other agents that may be useful include functionalized zeolites and the like as disclosed in U.S. Pat. No. 7,041,774 to Kishran, et al., and assigned to General Electric Company.

The dissolution generator and mixing apparatus described above may be located at a production facility, or at a distributor's facility, or at an end user's facility, or may be provided as a mobile device (e.g. mounted on a trailer).

The liquid additives and powder may be pre-packaged into a box or carton is needed to suit a particular application and piece of equipment. In the example described above wherein means are provided for three additives and one powder, the pre-package box or carton would contain 3, 1-gallon containers of liquid additives and one 1-gallon container of powder.

Some or all of powder and the liquid additives may be no-water-added compositions which contain little to no water (other than any water needed for basic compounding of the composition). Where the pre-packaged box or carton is required to be transported to the location of the dissolution generator and mixing apparatus, this absence or minimization of water minimizes the weight to be transported, thus improving cost and efficiency The use of pre-measured material and the rapid action of the dissolution generator and mixing system described above will make it to efficiently and economically prepare products on-site rather than preparing them at a production facility and transporting them to a distributor or end-user. The economics of packaging, shipping cost, and warehouse space savings is very attractive with employment of this system.

Testing has shown that that dissolution generator and mixing apparatus described above is capable of converting the contents of the above-described pre-measured box or carton into a drum in a short amount of time, for example less than 10 minutes, with enough inline agitation that the product can reach equilibrium in the product drum without fallout precipitation.

The use of the pre-measured components along with the rapid action of the dissolution generator and mixing apparatus means that precise metering is not required in order to provide a product of the desired dilution. The pre-measured components are provided in the correct quantities needed to provide a product of a desired dilution level when discharged into a drum or container having a known volume. The only requirement is that the pre-measured components are mixed into the product before the drum completes the filling process.

The final dilution level may be controlled by selecting the size of the product container into which the pre-measured components are mixed. For example, if the contents of the box were mixed into a 30-gallon drum, the resulting product would generally be considered a "super concentrate". This super concentrate would then be further diluted at the point of use to provide a ready-to-use product.

As another example, if the contents of the same box were mixed into 55-gallon drum, the resulting product would generally be considered a "concentrate". This concentrate would then be further diluted at the point of use to provide a ready-to-use product. The amount of additional water or solvent used to provide the ready-to-use product would be less than that used to dilute the super concentrate described above.

As another example, if the contents of the same box were mixed into a 60-gallon drum, the resulting product would generally be considered ready-to-use.

In any of the above examples, dispensing of the liquid product into the product container (e.g. drum) may be completed prior to the product container being volumetrically full. In such cases, the product container may be filled to capacity by continuing to supply solvent to the dissolution generator apparatus after the powder and liquids have been exhausted. The solvent will simply run through the apparatus, flushing out any remnant powder or liquid and completing the filling of the product container, and resulting in the desired final product dilution.

It will be understood that the final product concentration levels, the sizes of the product containers, the size of the pre-measured components, and the concentration of the pre-measured components may all be varied to suit a particular application. The common element of the method described herein is that the pre-measured components may be provided in a single size or quantity which may then be used to rapidly produce final products of different compositions and/or dilutions.

As an example, the box or cartons described above may be provided in different combinations, allowing different concentrations for each of the above containers.

Figure 13:
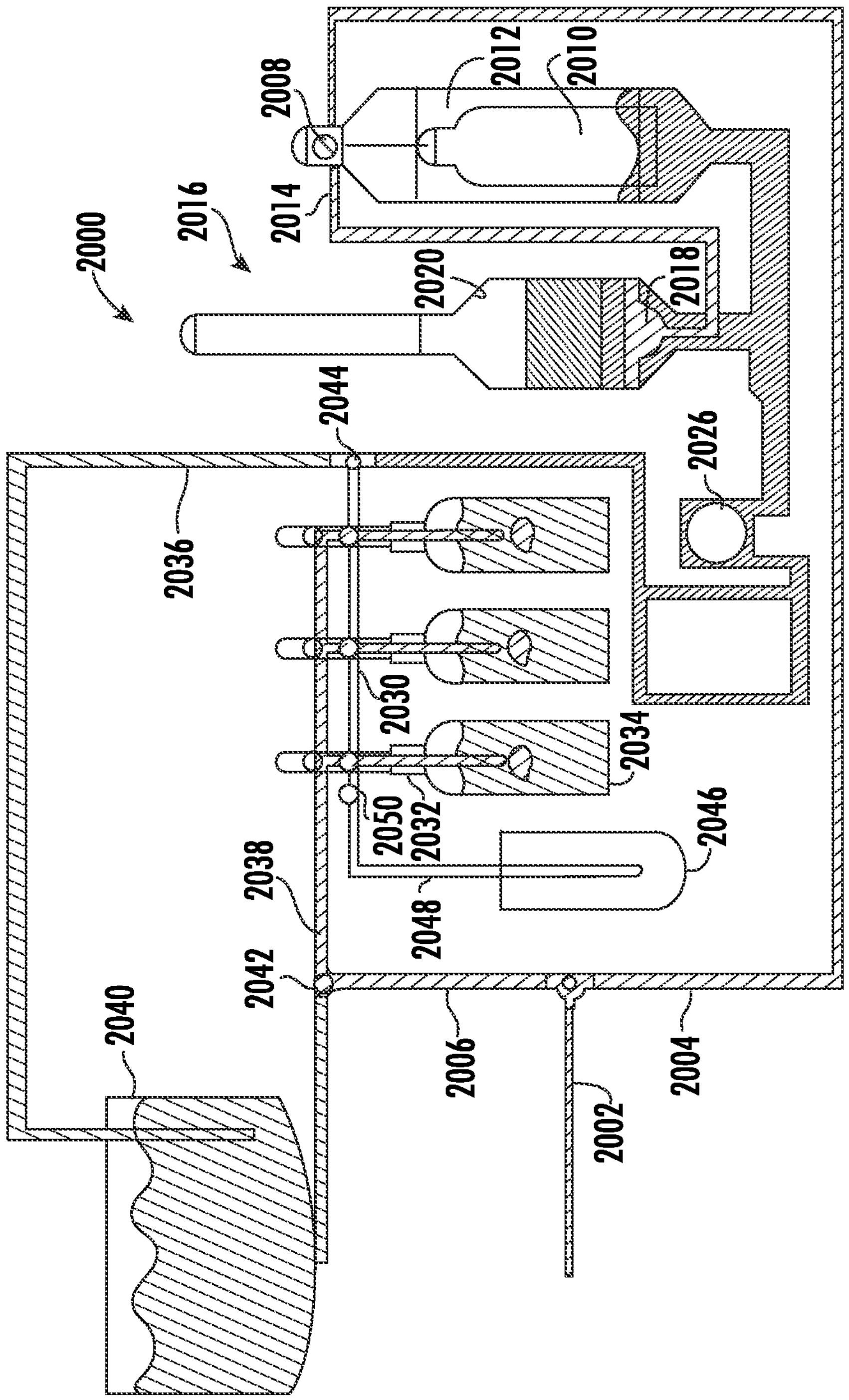
FIG. 13 is a schematic diagram of an exemplary dissolution generator and mixing apparatus, in a dissolving/mixing mode.

FIG. 13 illustrates an exemplary dissolution generator and mixing system. This is a modification of the apparatus shown in FIG. 12 and is intended as a further example of one possible configuration of the concepts described above. The apparatus 2000 includes fresh water supply line 2002 which is divided by a tee into first and second supply lines 2004, 2006 respectively. The first supply line 2004 is coupled to a float valve 2008 whose operation is controlled by a float 2010 disposed in a dissolved powder reservoir 2012. From the float valve 2008, a conduit 2014 leads to a dissolution generator 2016 of the type described above. Among other elements, the dissolution generator 2016 includes a nozzle 2018 which is supplied by the conduit 2014 and a powder chamber 2020 for receiving powder or particulate.

The dissolution generator 2016 discharges through a duct (not labeled) into the dissolved powder reservoir 2012. The dissolved powder reservoir 2012 is equipped with a circulation pump 2026 configured to discharge fluid containing dissolved powder from the dissolved powder reservoir 2012 into a mixing chamber 2030.

The second supply line 2006 is coupled to a filler supply pipe 2038 which is turn coupled to additive displacement valves 2032 of the type described above, which are in turn coupled to liquid containers 2034, for example conventional 1-gallon jugs. As described above, the additive displacement valves 2032 are effective to purge liquid contained in the liquid containers 2034 into the mixing chamber 2030. Within the mixing chamber 2030, the fluid containing dissolved powder and the liquid from the liquid containers 2034 mixes together to conform a complete product. The product exits the mixing chamber 2030 through one or more discharge pipes 2036. The discharge pipes 2036 may be connected to or placed directly over a holding tank 2040 for receiving final product.

A first control valve 2042 is connected between the holding tank 2040, second supply line 2006, and filler supply pipe 2038. It can be set in a first position permitting fluid flow between the second supply line 2006 and the filler supply pipe 2038, or a second position permitting flow only between the holding tank and the filler supply pipe 2038.

A second control valve 2044 is connected between the circulation pump 2026, mixing chamber 2030, and discharge pipe 2036. It can be set in a first position permitting fluid flow among the circulation pump 2026, the mixing chamber 2030, and the discharge pipe 2036, or a second position permitting flow only between the mixing chamber 2030 and the discharge pipe 2036.

The apparatus 2000 is provided with an overflow tank 2046 coupled to the mixing chamber 2030 through an overflow pipe 2048 and overflow valve 2050. The overflow valve 2050 can be set in a first position blocking fluid flow between the mixing chamber 2030 and the overflow pipe 2048, or a second position permitting fluid flow between the mixing chamber 2030 and the overflow pipe 2048.

As shown in FIG. 13, apparatus 2000 may be used for preparing final product and storing it in the holding tank 2040 as described above, with the first and second control valves set in their respective first positions. The overflow valve 2050 would be closed.

Figure 14:
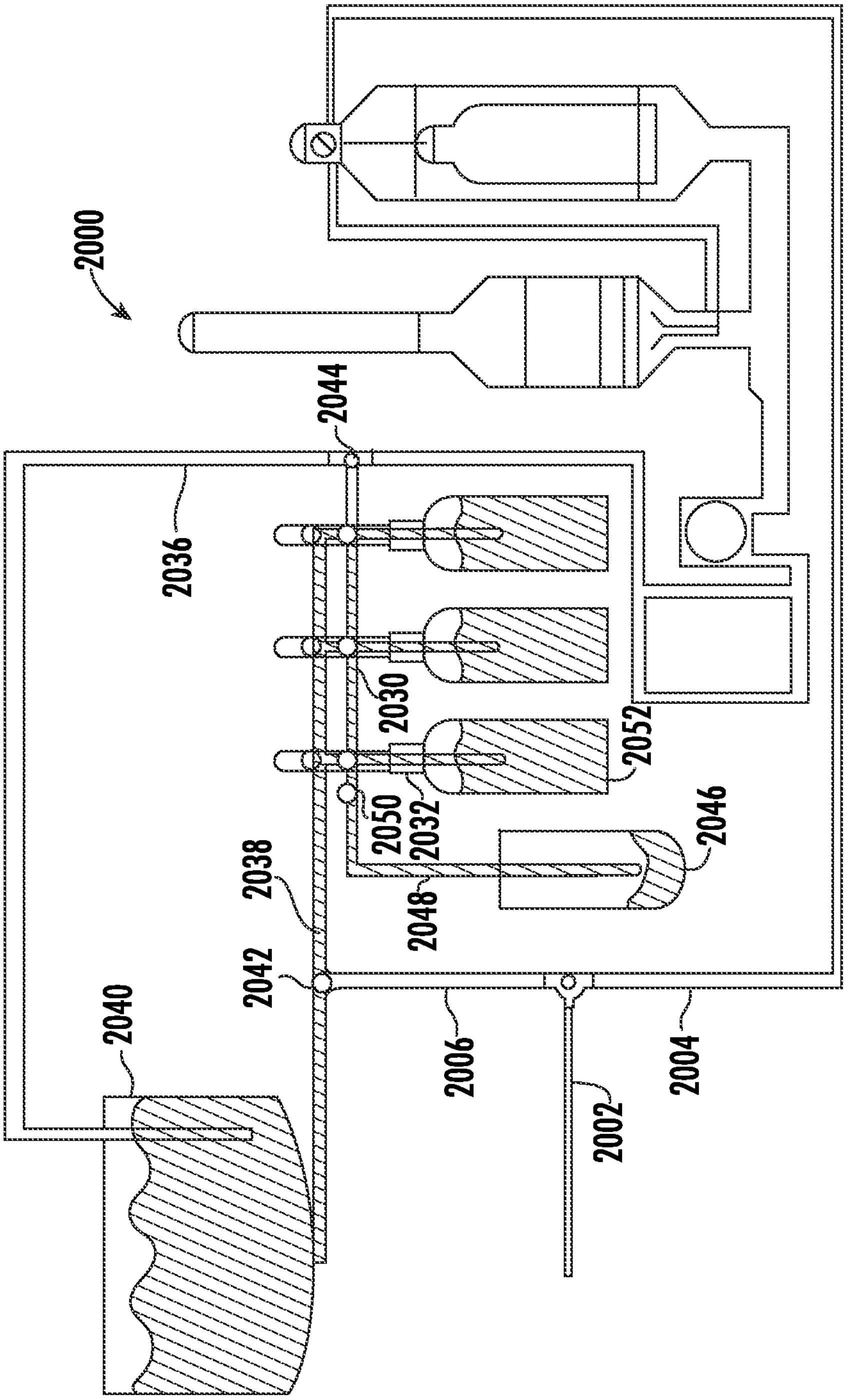
FIG. 14 is a schematic diagram of the apparatus of FIG. 13 in a bottling mode.

Referring to FIG. 14, apparatus 2000 may be used for bottling as follows. The first and second control valves 2042, 2044 would be set in their respective second positions. The overflow valve 2050 would be open (i.e. in the second position).

Product containers 2052 would be placed under the additive displacement valves 2032. When configured in this manner, product flows from the holding tank 2040 to the filler supply pipe 2038 which communicates with the additive displacement valves 2032. It will be understood that this type of valve typically includes a spring-loaded element which remains in a closed position until pressed into contact with the product container 2052. When the product container 2052 is brought into contact with the additive displacement valve 2032, product begins to flow. The containers 2052 may be brought into contact with the additive displacement valves 2032 by lowering the valves 2032 or raising the containers 2052.

Product flows into the product containers 2052 until it reaches a preset level which is an inherent function of the additive displacement valve 2032. Any excess product above this level flows back through the mixing chamber 2030, overflow valve 2050, and overflow pipe 2048 into the overflow container 2046. It can then be disposed of or saved for reuse.

While the invention has been described above according to some of its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains and which fall within the limits of the following claims.

What is claimed is:

1. A method of preparing and bottling a liquid product using a dissolution generator apparatus, the method comprising:

placing a powder-based constituent in a housing of a dissolution generator of the apparatus, adjacent a screen assembly;

using a pressure mechanism to apply a pressure to the powder against the screen assembly;

spraying at least a solvent at the powder from a spray nozzle through the screen assembly, thereby dissolving exposed powder and producing a solution;

discharging the solution into a mixing chamber of the apparatus;

using the solvent, purging at least one liquid additive from an additive container into the mixing chamber through an additive displacement valve;

mixing the solution and the at least one liquid additive in the mixing chamber so as to form the liquid product;

transferring the liquid product to a holding tank; and flowing the liquid product from the holding tank through the additive displacement valve into a product container.

2. The method of claim 1, further comprising channeling any liquid product which exceeds a preset level into an overflow container.

3. The method of claim 1, further comprising, after dispensing the product into the product container, continuing to fill the product container with the solvent flowing through the apparatus, so as to reach a predetermined dilution of the product.

4. The method of claim 1, further comprising, prior to the step of flowing the liquid product, changing the position of one or more control valves of the apparatus.

5. The method of claim 1, further comprising recirculating a mixture of the solvent and the solution through the spray nozzle, prior to discharging the solution into the mixing chamber.

6. The method of claim 1, further comprising providing a box or carton which contains a predetermined quantity of the at least one powder-based constituent and a predetermined quantity of the at least one liquid additive in an additive container.

7. The method of claim 1, wherein:

the screen assembly comprises: a metering screen having a first open area, said metering screen having a flat, convex or concave profile; and support screens disposed above and below the metering screen, each of the support screens having a second open area greater than the first open area.

8. The method of claim 1, wherein the spray nozzle comprises:

a freely rotatable central hub; and one or more spray arms extending from the central hub, the spray arms configured and oriented so as to produce a reaction force that rotates the spray nozzle in response to solvent being discharged therefrom.

9. The method of claim 1, further comprising using a primary dispersion structure including at least one moving mechanical element disposed on the same side of the screen assembly as the spray nozzle to cause shear mixing of the solution.

10. The method of claim 9, wherein the primary dispersion structure comprises a rotating blade or screen.

11. The method of claim 10, wherein the rotating blade or screen is positioned in close proximity to a stationary blade or screen.

12. The method of claim 10, wherein the rotating blade or screen is positioned in close proximity to the screen assembly.

* * * * *